March 13, 1928.
W. E. WINE
1,662,651
CAR DOOR MECHANISM
Filed July 27, 1927
3 Sheets-Sheet 1
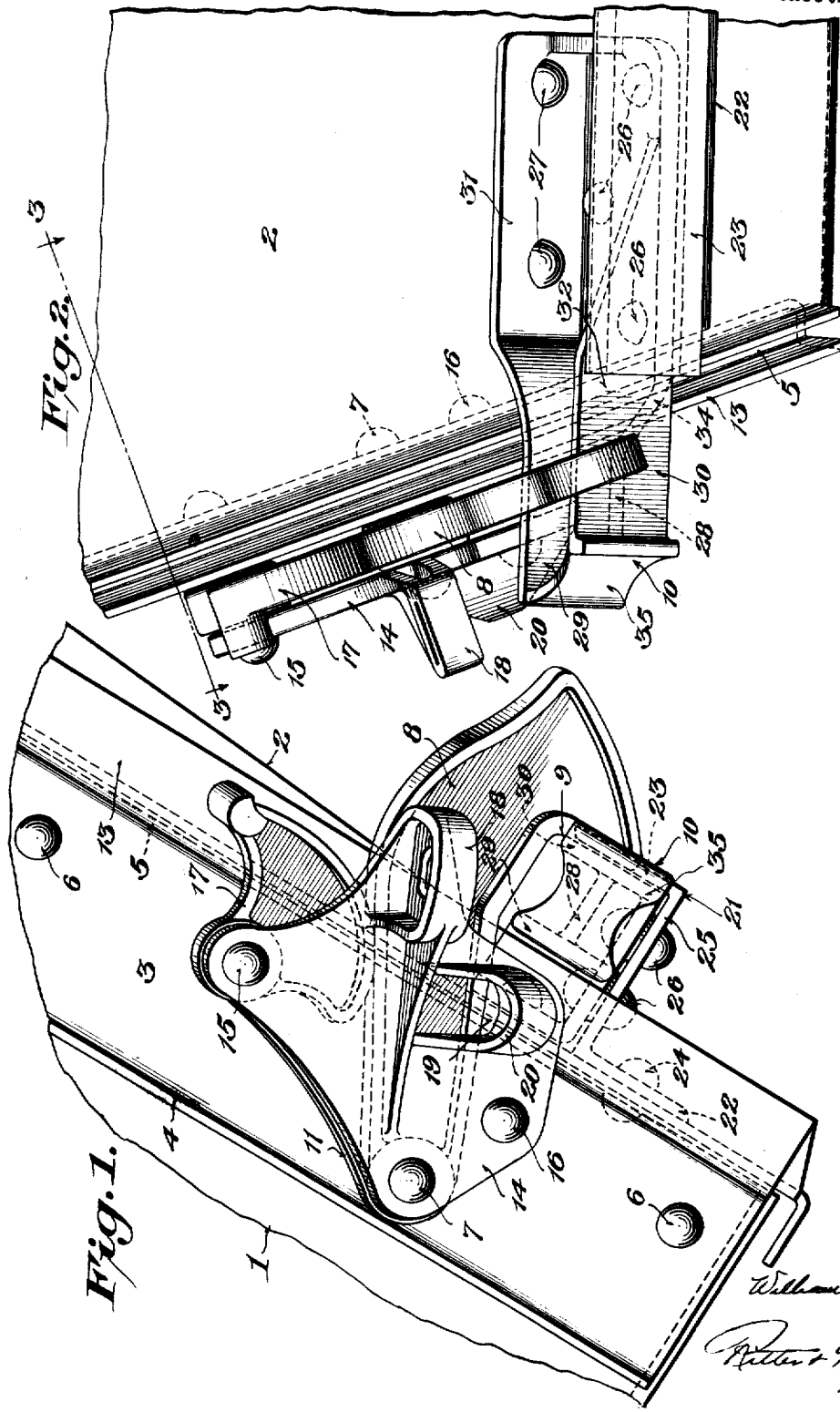
Inventor
William E. Wine
Ritter & Mechlin
his Attorney

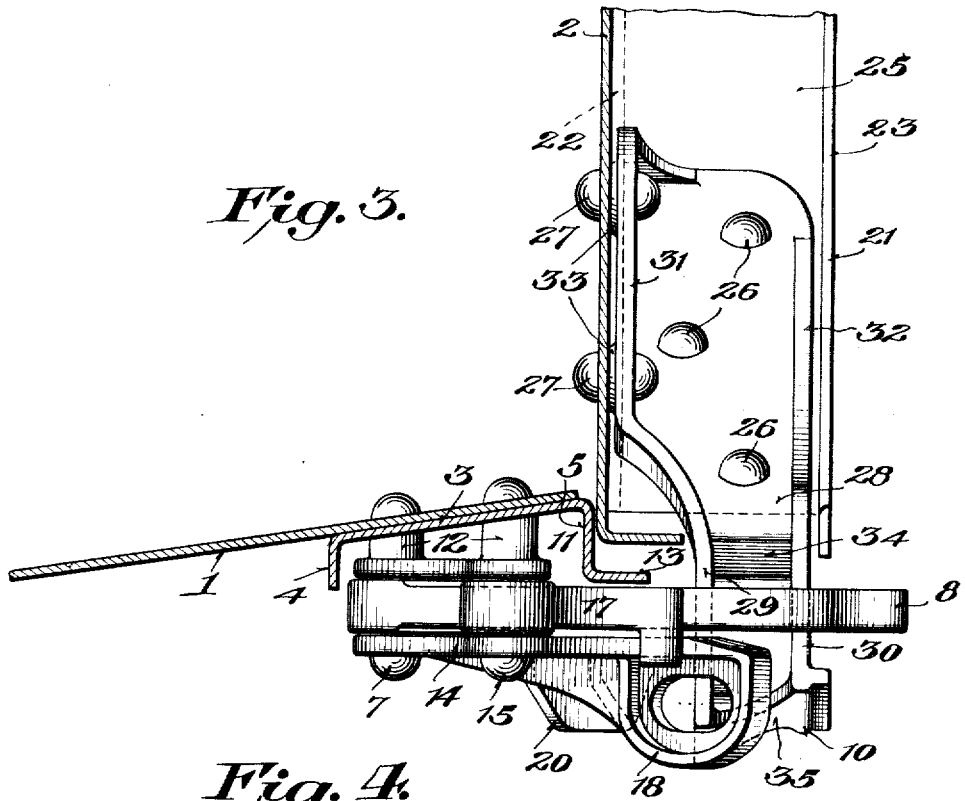
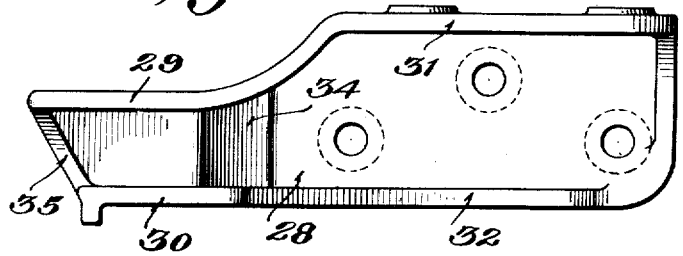
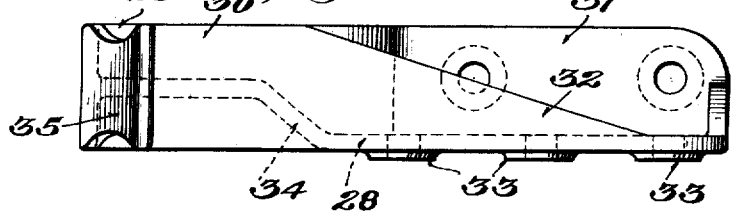

March 13, 1928.
W. E. WINE
CAR DOOR MECHANISM
Filed July 27, 1927
1,662,651
3 Sheets-Sheet 3
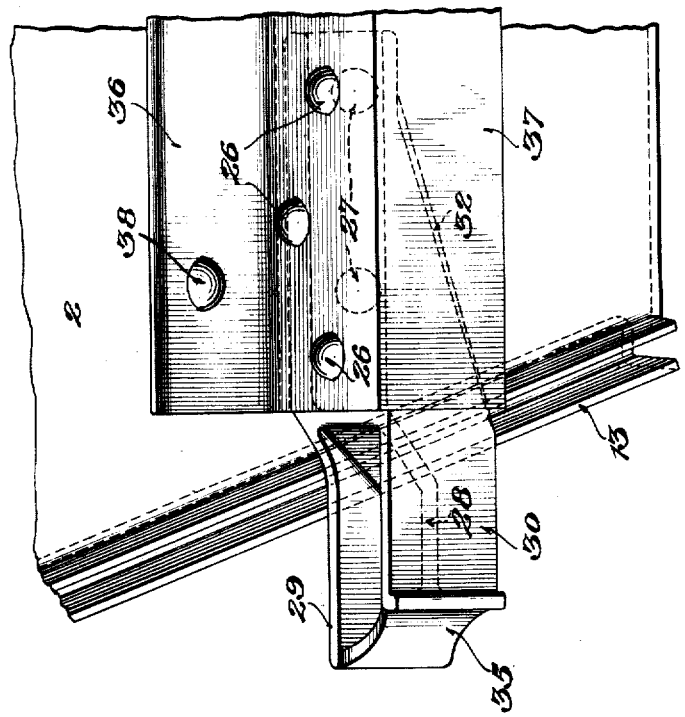
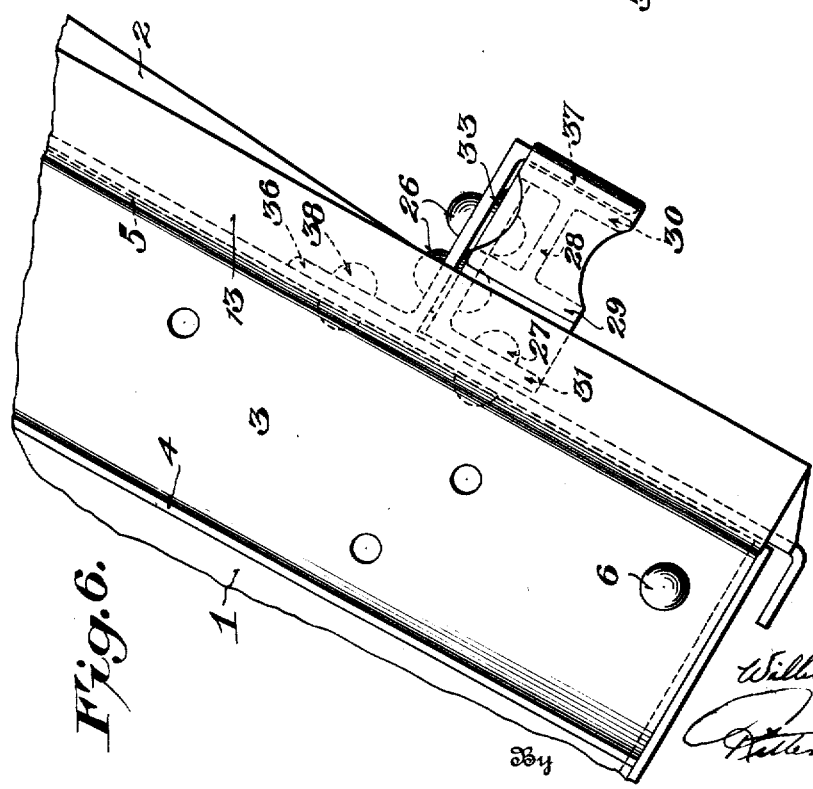
Inventor
William E. Wine
By Ruter & MeLin
His Attorney Patented Mar. 13, 1928.

1,662,651

UNITED STATES PATENT OFFICE.

WILLIAM E. WINE, OF TOLEDO, OHIO.

CAR-DOOR MECHANISM.

Application filed July 27, 1927. Serial No. 208,809.

My invention relates to door mechanism for railway cars which is especially suitable for application to hopper cars, although it may advantageously be employed on cars of other types.

The principal object of the invention is to afford a simple and rugged mechanism for reliably retaining a gravity actuated dump door of a car in closed position. A further object of the invention is to afford means for effectively reinforcing that part of the car body to which are transmitted the forces incident to supporting the door in closed position.

A principal feature of the invention consists in constructing a hopper of a railway car with a reinforcing member extending along the side sheet thereof adjacent its usual discharge opening, the said member having a plurality of laterally spaced flanges substantially normal to the side sheet, and in associating therewith means for retaining the hopper door in closed position, the said means involving a movable member and a fixed member, the movable member being secured to the hopper intermediate the spaced flanges of the reinforcing member.

Another feature of the invention consists in securing to the side sheet of a hopper of a car adjacent its discharge opening, a channel shaped reinforcing member, and in combining therewith means operatively interposed between the car body and the hopper door for retaining the latter in closed position, said means involving an arm secured to the door and projecting outwardly beyond the side of the hopper, a pivoted hook for cooperating with the arm, and means for mounting the hook upon the car body, said last named means including a filler positioned in the reinforcing channel and interposed between the hook and the side sheet of the hopper.

A further feature of the invention consists in providing in combination with a car having a lading discharge opening, a hinged door for closing said opening, and means for retaining the door in closed position, said means involving an arm carried by the door and a hook carried by the car body for cooperating with the arm, the latter being formed at its inner end as a channel section and at its outer end as an I-section.

Other features of the invention, residing in particular constructions and advantageous relations of parts, will hereinafter appear and be pointed out in the claims.

In the drawings illustrating preferred embodiments of the invention:

Figure 1 is a fragmentary side elevational view of a portion of a hopper car embodying the door mechanism involving my invention.

Figure 2 is a fragmentary end elevational view of the construction shown in Fig. 1.

Figure 3 is a sectional view on the line 3—3, Fig. 2.

Figure 4 is a detail plan view of the door arm.

Figure 5 is a detail side elevational view of the construction shown in Fig. 4.

Figure 6 is a fragmentary side elevational view similar to Fig. 1, illustrating a modified form of the invention, the locking mechanism carried by the car body being omitted.

Figure 7 is a fragmentary end elevational view of the construction shown in Fig. 6.

The car illustrated in the drawings is of the well known type embodying hoppers whose discharge openings are closed by hinged doors. The sloping side wall or sheet of the hopper is indicated by the reference numeral 1, while 2 indicates the door, the latter being hinged to the car body so as to swing to open position under the influence of gravity. Adjacent the discharge opening of the hopper the side sheet is provided with a reinforcing channel fashioned with a web 3 and having outwardly extending laterally spaced flanges 4 and 5, respectively, substantially normal to the plane of the side sheet. The web 3 contacts with and is secured to the outer face of the side sheet, preferably by means of rivets 6.

Pivotally mounted on the side sheet intermediate the laterally spaced flanges 4 and 5 of the reinforcing member, by means of the rivet 7, is a door locking member preferably in the form of a hook 8 having a ledge 9 for cooperating with a door arm 10 to retain the door in closed position. In order that the hook may swing in a plane substantially parallel to the plane of the side sheet, it is spaced outwardly therefrom by a filler or bracket 11 so as to clear the outstanding flange 5 of the reinforcing member. The filler 11 is fashioned with rivet receiving thimbles or lugs 12 which bear at their inner ends against the web 3. The reinforcing channel has a return flange 13 along the marginal edge of the flange 5 over which the hook swings, thus forming not only an effective door seal but also a rubbing face for the hook.

Overlying the hook 8 is a cover plate 14 secured to the filler and to the car body by means of rivets 7, 15 and 16, the rivet 7 being the pivot for the hook and the rivet 15 serving as a pivot for a cam or dog 17 employed to lock the hook in door supporting position. Formed integral with the cover plate 14 and projecting outwardly therefrom is a pry bar fulcrum 18 adapted to cooperate with a removable lever for actuating the door. This fulcrum, as shown, is preferably in the form of a loop or eye through which a pry bar may be inserted so as to bring its lower end into engagement with the outer end of the door arm 10. The cover plate may be provided at a point adjacent the shank of the hook 8 with an aperture 19 bordered by a marginal flange 20. This construction permits a bar to be inserted beneath the hook to pry it upward to unlocked position, thereby releasing the door.

As the forces transmitted from the door through the hook to the car body tend to set up a torque in that part of the hopper to which the locking mechanism is attached, a particularly desirable construction is produced by mounting the hook and its filler between the outstanding flanges of the channel reinforcing member. The back or rear flange 4 of the channel stiffens the structure against the outward reaction that results from the pull of the hook, while the other flange 5 serves to stiffen it in the opposite direction.

Secured to the outer face of the door adjacent the lower free edge thereof is a stiffening member or spreader 21 which preferably is in the form of a Z-bar. In the form of the invention illustrated in Figs. 1 to 3, inclusive, the inner or door contacting flange 22 of the Z-bar extends downwardly and its outer flange 23 extends upwardly, the bar being secured to the door by rivets 24 passing through the lower flange 22.

The door arm 10 extends between the door and the upper flange 23 of the stiffener, being secured to the web 25 of the latter by rivets 26 and to the door plate by rivets 27. It may advantageously be fashioned as a casting having a bent web 28 and flanges 29, 30, 31 and 32, respectively, projecting therefrom, the flanges 29 and 30 being at the outer end of the arm and extending on opposite sides of the webs, thus forming an I-section therewith, and the flanges 31 and 32 being at the inner end of the door arm and extending on one side only of the web, thus forming with the latter a channel section. The inner end of the web 28, which if desired may be provided with rivet bosses 33, is disposed parallel to and in contact with the outwardly projecting web portion 28 of the door spreader. Intermediate its ends the web is inclined as indicated at 34, and at its outer end it terminates in a substantially vertical end wall 35 which inclines inwardly toward the center of the car and serves to tie together the flanges 29 and 30 of the arm.

It will be observed that the flanges of the I-section of the door arm afford means cooperable with the hook to support the door in a plurality of positions of closure, the ledge 9 of the hook when in engagement with the flange 29 supporting the door in partially closed position and when in engagement with the flange 30 supporting the door in fully closed position. By the construction of the door arm disclosed the torsional strains usually imparted to the door stiffener by the hook are reduced to a minimum.

The modified form of construction illustrated in Figs. 6 and 7 is the same as that heretofore described except that a slightly different manner of mounting the door arm is disclosed. In this form of the invention the inner or door contacting flange 36 of the Z-bar door stiffener extends upwardly and its outer flange 37 extends downwardly. As in the other form of the invention the inner flange of the Z-bar is secured to the door plate by rivets 38.

The door arm 39, while being substantially the same as that heretofore described, differs therefrom only in that the channel section at the inner end of the arm opens downwardly instead of upwardly. As the details of construction are identical with those heretofore described they are indicated by corresponding reference numerals.

I claim:—

1. In a car door mechanism, the combination with a car having a hopper provided with a lading discharge opening, of a door for closing said opening, a reinforcing member extending along the side sheet of the hopper adjacent the discharge opening thereof, said member having a plurality of laterally spaced flanges substantially normal to the side sheet, and means for retaining the door in closed position involving a movable member and a fixed member, the movable member being secured to the hopper intermediate the spaced flanges of the reinforcing member.

2. In a car door mechanism, the combination with a car having a lading discharge opening, of a hinged door for closing said opening, a reinforcing member secured to the outer face of the side sheet of the hopper adjacent the discharge opening, said member being formed with a web portion having spaced flanges united thereto, and means for retaining the door in closed position involving a movable member and a fixed member, the movable member being secured to the web portion of the reinforcing member.

3. In a car door mechanism, the combination with a car having a hopper provided with a lading discharge opening, of a hinged door for closing said opening, a channel-shaped reinforcing member secured to the side sheet of the hopper adjacent the discharge opening thereof, a pivoted hook mounted on the car for cooperating with the door to retain the latter in closed position, and means for pivotally connecting the hook to the car body, the said means passing through the web of the channel-shaped reinforcing member.

4. In a car door mechanism, the combination with a car having a hopper provided with a lading discharge opening, of a hinged door for closing the said opening, a reinforcing member secured to and extending along the side sheet of the hopper adjacent the discharge opening thereof, the said member being formed with a web and having united thereto a plurality of spaced outwardly directed flanges, and a pivoted hook cooperable with the door for supporting it in closed position, the said hook being secured to the car body by means passing through the web of the reinforcing member.

5. In a car door mechanism, the combination with a car having a hopper provided with a lading discharge opening, of a door for closing said opening, a reinforcing member secured to the outer face of the side sheet of the hopper adjacent the discharge opening thereof, the said member being formed with a web and having laterally spaced flanges united thereto, the latter extending outwardly from the web substantially normal to the side sheet, and means secured to the car body intermediate the said laterally spaced flanges for cooperating with the door to retain it in closed position.

6. In a car door mechanism, the combination with a car having a hopper provided with a lading discharge opening, of a hinged door for closing said opening, a reinforcing member secured to the side sheet of the hopper adjacent the discharge opening thereof, the said membr having a plurality of laterally spaced flanges projecting outwardly from the car body, and a pivoted door supporting hook secured to the car body intermediate the spaced flanges of the reinforcing member, one of said flanges being reflanged to afford a rubbing face for the hook during its pivotal movement.

7. In a car door mechanism, the combination with a car having a hopper provided with a lading discharge opening, of a hinged door for closing said opening, an outwardly opening channel-shaped reinforcing member secured to the side sheet of the hopper adjacent the discharge opening thereof, and means operatively interposed between the car body and the door for retaining the latter in closed position involving an arm secured to the door and projecting outwardly beyond the side of the hopper, a pivoted hook for cooperating with said arm, and means for mounting the hook upon the car body, said last named means including a filler positioned in the reinforcing channel and interposed between the hook and the side sheet of the hopper.

8. In a car door mechanism, the combination of a car having a hopper provided with a lading discharge opening, of a hinged door for closing said opening, a reinforcing member secured to the side sheet of the hopper adjacent the discharge opening thereof, said member having a plurality of laterally spaced flanges projecting outwardly from the car body, a hook mounted upon the car body for cooperating with the door to retain it in closed position, and a filler interposed between the hook and car body and intermediate the outwardly projecting flanges of the reinforcing member for spacing the hook outwardly of the car body.

9. In a car door mechanism, the combination with a car body having a lading discharge opening, of a hinged door for closing said opening, and means for retaining the door in closed position involving an arm secured to the door and projecting outwardly beyond the side of the car, and a hook pivotally mounted on the car body for cooperating with the arm, the latter being formed with a web and having at its outer end a plurality of laterally spaced flanges extending above and below the said web.

10. In a car door mechanism, the combination of a car body having a lading discharge opening, of a hinged door for closing said opening, and means for retaining the door in closed position involving an arm secured to the door and extending outwardly beyond an edge of the latter, and a hook pivotally mounted on the car body for cooperating with the said arm, the latter being formed at its outer end as an I-section.

11. In a car door mechanism, the combination of a car body having a lading discharge opening, of a hinged door for closing said opening, a door arm carried by the door and projecting outwardly beyond an edge of the latter, and a hook pivotally mounted on the car body for cooperating with the arm to support the door in closed position, the said arm being formed with a web and having a plurality of flanges between which the web intervenes, the flanges at the outer end of the arm projecting upwardly and downwardly from the web and the flanges at the inner end of the arm projecting only in one direction from the web.

12. In a car door mechanism, the combination of a car body having a lading discharge opening, of a hinged door for closing said opening, and means for retaining the door in closed position, said means involving an arm carried by the door, and a hook carried by the car body for cooperating with the arm, the latter being formed at its inner end as a channel section and at its outer end as an I-section.

13. In a car door mechanism, the combination of a car body having a lading discharge opening, of a door for closing said opening, an arm secured to the door and projecting outwardly beyond an edge of the latter and a hook pivotally mounted on the car body for cooperating with the said arm to support the door in closed position, the arm being formed with a bent web and having a plurality of flanges between which the web intervenes, the flanges at one end of the arm forming a channel with the web and at the other end of the arm forming an I-section.

14. In a car door mechanism, the combination with a car body having a lading discharge opening, of a door for closing said opening, a stiffener for the door, and means for supporting the door in closed position involving an arm secured to the stiffener and projecting outwardly beyond an edge of the latter, and a hook pivotally mounted on the door for cooperating with the arm, the latter being formed with a bent web and having a plurality of flanges extending on opposite sides of the web and forming therewith at the outer end of the bar an I-section, one of the flanges of the I-section constituting a seat for the hook to support the door in partially closed position and the other of said flanges constituting a seat for the hook to support the door in fully closed position.

15. In a car door mechanism, the combination with a car having a hopper provided with a lading discharge opening, of a door for closing said opening, a reinforcing member secured to the outer face of the side sheet of the hopper adjacent the discharge opening thereof, the said member being formed with a web and having outwardly projecting laterally spaced flanges united thereto, and means for supporting the door in closed position involving a movable member and a fixed member, one of said members being secured to the hopper intermediate the spaced flanges of the reinforcing member.

In testimony whereof I affix my signature.

WILLIAM E. WINE.

ing said opening, and means for retaining the door in closed position, said means involving an arm carried by the door, and a hook carried by the car body for cooperating with the arm, the latter being formed at its inner end as a channel section and at its outer end as an I-section.

13. In a car door mechanism, the combination of a car body having a lading discharge opening, of a door for closing said opening, an arm secured to the door and projecting outwardly beyond an edge of the latter and a hook pivotally mounted on the car body for cooperating with the said arm to support the door in closed position, the arm being formed with a bent web and having a plurality of flanges between which the web intervenes, the flanges at one end of the arm forming a channel with the web and at the other end of the arm forming an I-section.

14. In a car door mechanism, the combination with a car body having a lading discharge opening, of a door for closing said opening, a stiffener for the door, and means for supporting the door in closed position involving an arm secured to the stiffener and projecting outwardly beyond an edge of the latter, and a hook pivotally mounted on the door for cooperating with the arm, the latter being formed with a bent web and having a plurality of flanges extending on opposite sides of the web and forming therewith at the outer end of the bar an I-section, one of the flanges of the I-section constituting a seat for the hook to support the door in partially closed position and the other of said flanges constituting a seat for the hook to support the door in fully closed position.

15. In a car door mechanism, the combination with a car having a hopper provided with a lading discharge opening, of a door for closing said opening, a reinforcing member secured to the outer face of the side sheet of the hopper adjacent the discharge opening thereof, the said member being formed with a web and having outwardly projecting laterally spaced flanges united thereto, and means for supporting the door in closed position involving a movable member and a fixed member, one of said members being secured to the hopper intermediate the spaced flanges of the reinforcing member.

In testimony whereof I affix my signature.

WILLIAM E. WINE.

DISCLAIMER.

1,662,651.—*William E. Wine*, Toledo, Ohio. CAR-DOOR MECHANISM. Patent dated March 13, 1928. Disclaimer filed February 4, 1929, by the patentee, the assignee, *The Wine Railway Appliance Co.*, consenting.

Hereby enters this disclaimer to claims 5 and 15, in said specification, which are, respectively, in the following words, to wit:

"5. In a car door mechanism, the combination with a car having a hopper provided with a lading discharge opening, of a door for closing said opening, a reinforcing member secured to the outer face of the side sheet of the hopper adjacent the discharge opening thereof, the said member being formed with a web and having laterally spaced flanges united thereto, the latter extending outwardly from the web substantially normal to the side sheet, and means secured to the car body intermediate the said laterally spaced flanges for cooperating with the door to retain it in closed position."

"15. In a car door mechanism, the combination with a car having a hopper provided with a lading discharge opening, of a door for closing said opening, a reinforcing member secured to the outer face of the side sheet of the hopper adjacent the discharge opening thereof, the said member being formed with a web and having outwardly projecting laterally spaced flanges united thereto, and means for supporting the door in closed position involving a movable member and a fixed member, one of said members being secured to the hopper intermediate the spaced flanges of the reinforcing member."

[*Official Gazette February 19, 1929.*]

DISCLAIMER.

1,662,651.—*William E. Wine*, Toledo, Ohio. CAR-DOOR MECHANISM. Patent dated March 13, 1928. Disclaimer filed February 4, 1929, by the patentee, the assignee, *The Wine Railway Appliance Co.*, consenting.

Hereby enters this disclaimer to claims 5 and 15, in said specification, which are, respectively, in the following words, to wit:

"5. In a car door mechanism, the combination with a car having a hopper provided with a lading discharge opening, of a door for closing said opening, a reinforcing member secured to the outer face of the side sheet of the hopper adjacent the discharge opening thereof, the said member being formed with a web and having laterally spaced flanges united thereto, the latter extending outwardly from the web substantially normal to the side sheet, and means secured to the car body intermediate the said laterally spaced flanges for cooperating with the door to retain it in closed position."

"15. In a car door mechanism, the combination with a car having a hopper provided with a lading discharge opening, of a door for closing said opening, a reinforcing member secured to the outer face of the side sheet of the hopper adjacent the discharge opening thereof, the said member being formed with a web and having outwardly projecting laterally spaced flanges united thereto, and means for supporting the door in closed position involving a movable member and a fixed member, one of said members being secured to the hopper intermediate the spaced flanges of the reinforcing member."

[*Official Gazette February 19, 1929.*]